United States Patent [19]

Ikeuchi et al.

[11] Patent Number: 5,451,648

[45] Date of Patent: Sep. 19, 1995

[54] PROCESS FOR PRODUCING STYRENIC POLYMER

[75] Inventors: Satoshi Ikeuchi; Norio Tomotsu, both of Ichihara, Japan

[73] Assignee: Idemitsu Kosan Co., Ltd., Tokyo, Japan

[21] Appl. No.: 364,728

[22] Filed: Dec. 27, 1994

[30] Foreign Application Priority Data

Dec. 27, 1993 [JP] Japan .................................. 5-329510

[51] Int. Cl.$^6$ .......................... C08F 4/642; C08F 2/38; C08F 12/08
[52] U.S. Cl. .................................... 526/153; 526/133; 526/134; 526/151; 526/160; 526/905
[58] Field of Search ............... 526/133, 134, 160, 165, 526/905, 151, 153

[56] References Cited

U.S. PATENT DOCUMENTS 4,990,580  2/1991  Ishihara et al. ................. 526/905 X
5,064,918  11/1991  Malanga ................................. 526/77

Primary Examiner—Fred Teskin
Attorney, Agent, or Firm—Oblon, Spivak, McClelland, Maier, & Neustadt

[57] ABSTRACT

There is disclosed a process for producing a styrenic polymer having a syndiotactic configuration which comprises polymerizing a styrenic monomer containing hydrogen dissolved therein at a hydrogen partial pressure of at most 1 kg/cm$^2$G by the use of a polymerization catalyst comprising an (a) transition metal compound and a (b) coordination complex compound composed of a cation and an anion in which a plurality of radicals are bonded to a metal, or an aluminoxane and, when necessary, a (c) alkylating agent. The above process is capable of modifying the molecular weight of the objective SPS, lowering its molecular weight without expanding the molecular weight distribution, and decreasing the required quantity of the catalyst and the residual quantities of metals in the resultant SPS, whereby the production cost of the objective SPS is considerably curtailed.

9 Claims, No Drawings

PROCESS FOR PRODUCING STYRENIC POLYMER

BACKGROUND OF THE INVENTION

1. Field of the Invention

The present invention relates to a process for producing a styrenic polymer having a syndiotactic configuration. More particularly, it pertains to a process for producing such a styrenic polymer which is capable of modifying the molecular weight of the polymer without altering its molecular weight distribution and at the same time, of curtailing the production cost of the polymer.

2. Description of the Related Arts

In recent years, there has been proposed a process for producing a styrenic polymer having a syndiotactic configuration (hereinafter sometimes referred to as "SPS") by polymerizing a styrenic monomer by means of a catalyst comprising a transition metal compound as a primary ingredient, especially a titanium compound and an alkylaluminoxane (refer to Japanese Patent Application Laid-Open No. 187708/1987).

There has also been proposed a process for efficiently producing such a styrenic polymer (SPS) by the use of a catalyst comprising a coordination complex compound composed of an anion in which a plurality of radicals are bonded to a metal and a cation, while dispensing with an aluminoxane which is expensive and is to be used in a large amount (refer to Japanese Patent Application Laid-Open Nos. 415573/1990, 415574/1990, etc.).

In addition, there has been proposed a process for polymerizing a styrenic monomer by the use of the abovementioned catalyst comprising a transition metal compound and an alkylaluminoxane, characterized in that hydrogen is made to exist as a molecular weight modifier in the polymerizing system for the purpose of modifying the molecular weight of the styrenic polymer to be produced (refer to Japanese Patent Application Laid-Open No. 179906/1988).

However, in the case of employing a catalyst comprising a coordination complex compound composed of an anion in which a plurality of radicals are bonded to a metal and a cation in place of an aluminoxane to compensate for the expensiveness of an aluminoxane and a low yield of SPS due to the use thereof, the polymerization temperature is made higher or a large amount of an alkylaluminum as a molecular weight modifier is added to the polymerization system. Nevertheless, the aforesaid method suffers the disadvantages that the yield of the SPS to be produced is still low and the amounts of residual metals are unfavorably increased.

As a result of intensive research and investigation made by the present inventors under such circumstances, it has been found that in the case of polymerizing a styrenic monomer by the use of a transition metal compound and a coordination complex compound composed of an anion in which a plurality of radicals are bonded to a metal and an anion or an aluminoxane and, when necessary, an alkylating agent, the presence of hydrogen in the polymerization system, exerts considerable effects on both the molecular weight and the molecular weight distribution of the styrenic polymer to be produced. The present invention has been accomplished on the basis of the above-mentioned finding and information.

SUMMARY OF THE INVENTION

Specifically, the present invention provides a process for producing a styrenic polymer having a syndiotactic configuration which comprises polymerizing a styrenic monomer containing hydrogen dissolved therein at a hydrogen partial pressure of at most 1 kg/cm²G by the use of a polymerization catalyst comprising an (a) transition metal compound and (b) at least one member selected from the group consisting of a coordination complex compound composed of a cation and an anion in which a plurality of radicals are bonded to a metal, and an aluminoxane; and also a process for producing a styrenic polymer having a syndiotactic configuration which comprises polymerizing a styrenic monomer containing hydrogen dissolved therein at a hydrogen partial pressure of at most 1 kg/cm²G by the use of a polymerization catalyst comprising an (a) transition metal compound, (b) at least one member selected from the group consisting of a coordination complex compound composed of a cation and an anion in which a plurality of radicals are bonded to a metal, and an aluminoxane and a (c) alkylating agent.

DESCRIPTION OF THE PREFERRED EMBODIMENT

In the process according to the present invention, a styrenic monomer is polymerized in the presence of a polymerization catalyst comprising an (a) transition metal compound and (b) at least one member selected from the group consisting of a coordination complex compound composed of a cation and an anion in which a plurality of radicals are bonded to a metal; and an aluminoxane and, when necessary, an alkylating agent.

As an (a) transition metal compound usable in the process of the present invention, mention may be made of a variety of compounds, usually the compound represented by the general formula (I) or (II)

$$MR^1_a R^2_b R^3_c R^4_{4-(a+b+c)} \tag{I}$$

$$MR^1_d R^2_e R^3_{3-(d+e)} \tag{II}$$

wherein M is a metal belonging to any of the groups 3 to 6 of the Periodic Table or a lanthanum series metal; $R^1$, $R^2$, $R^3$ and $R^4$ are each an alkyl group, an alkoxyl group, an aryl group, a cyclopentadienyl group, an alkylthio group, a substituted cyclopentadienyl group, an indenyl group, a substituted indenyl group, a fluorenyl group, a halogen atom or a chelating agent; a, b and c are each an integer of from 0 to 4; d and e are each an integer of from 0 to 3; and any two of $R^1$ to $R^4$ may form a complex which is crosslinked with $CH_2$, $Si(CH_3)_2$ or the like.

As a metal belonging to any of the groups 3 to 6 of the Periodic Table or a lanthanum series metal as indicated by M, there are preferably employed the group 4 metals, especially titanium, zirconium, hafnium and the like. Various titanium compounds can be used and a preferred example is at least one compound selected from the group consisting of titanium compounds and titanium chelate compounds represented by the general formula:

$$TiR^5_a R^6_b R^7_c R^8_{4-(a+b+c+)} \tag{III}$$

or $$TiR^5{}_d R^6{}_e R^7{}_{3-(d+e)} \qquad (IV)$$

wherein $R^5$, $R^6$, $R^7$ and $R^8$ are each a hydrogen atom, an alkyl group having 1 to 20 carbon atoms, an alkoxyl group having 1 to 20 carbon atoms, an aryl group having 6 to 20 carbon atoms, an alkylaryl group, an arylalkyl group, an acyloxyl group having 1 to 20 carbon atoms, a cyclopentadienyl group, a substituted cyclopentadienyl group, an indenyl group a substituted indenyl group, a fluorenyl group, an alkylthio group, an arylthio group, a chelating agent or a halogen atom; a, b and c are each an integer from 0 to 4; d and e are each an integer from 0 to 3; and any two of $R^5$ to $R^8$ may form a complex which is crosslinked with $CH_2, Si(CH_3)_2$ or the like.

$R^5$, $R^6$, $R^7$ and $R^8$ in the general formulae (III) and (IV) each represent a hydrogen atom, an alkyl group having 1 to 20 carbon atoms (specifically, methyl group, ethyl group, propyl group, butyl group, amyl group, isoamyl group, isobutyl group, octyl group and 2-ethylhexyl group), an alkoxyl group having 1 to 20 carbon atoms (specifically, methoxyl group, ethoxyl group, propoxyl group, butoxyl group, amyloxyl group, hexyloxyl group, and 2-ethylhexyloxyl group), an aryl group having 6 to 20 carbon atoms, an alkylaryl group, an arylalkyl group (specifically, phenyl group, tolyl group, xylyl group and benzyl group), an acyloxyl group having 1 to 20 carbon atoms (specifically, heptadecylcarbonyloxy group), a cyclopentadienyl group, a substituted cyclopentadienyl group (specifically, methylcyclopentadienyl group, 1,2-dimethylcyclopentadienyl group, pentamethylcyclopentadienyl group and 4, 5, 6, 7-tetrahydro-1, 2, 3-trimethylindenyl group), an indenyl group, a substituted indenyl group (specifically, methylindenyl group, dimethylindenyl group, tetramethylindenyl group and hexamethylindenyl group), a fluorenyl group (specifically, methylfluorenyl group, dimethylfluorenyl group, tetramethylfluorenyl group and octamethylfluorenyl group), an alkylthio group (specifically, methylthio group, ethylthio group, butylthio group, amylthio group, isoamylthio group, isobutylthio group, octylthio group and 2-ethylhexylthio group), an arylthio group (specifically, phenylthio group, p-methylphenylthio group and p-methoxyphenylthio group), a chelating agent (specifically, 2, 2'-thiobis (4-methyl-6-tert-butylphenyl) group, or a halogen atom (specifically, chlorine, bromine, iodine and fluorine). These $R^5$, $R^6$, $R^7$, $R^8$ may be the same as or different from each other.

More desirable titanium compounds include a titanium compound represented by the formula(V)

$$TiRXYZ \qquad (V)$$

wherein R represents a cyclopentadienyl group, a substituted cyclopentadienyl group, an indenyl group, a substituted indenyl group or a fluorenyl group; X, Y, and Z, independently of one another, are a hydrogen atom, an alkyl group having 1 to 12 carbon atoms, an alkoxy group having 1 to 12 carbon atoms, an aryl group having 6 to 20 carbon atoms, an aryloxyl group having 6 to 20 carbon atoms, an arylalkyl group having 6 to 20 carbon atoms, an alkyl-or-arylamide group having 1 to 40 carbon atoms or a halogen atom. Here, any one of X, Y and Z and R may form a compound which is crosslinked with $CH_2$, $SiR_2$ or the like.

The substituted cyclopentadienyl group represented by R in the above formula is, for example, a cyclopentadienyl group substituted by at least one of an alkyl group having 1 to 6 carbon atoms, more specifically, methylcyclopentadienyl group, 1,2-dimethylcyclopentadienyl group, 1,2,4-trimethylcyclopentadienyl group, 1,2,3,4-tetramethylcyclopentadienyl group, Trimethylsilylcyclopentadienyl group, 1,3-di (trimethylsilyl) cyclopentadienyl group, tert-butylcyclopentadienyl group, 1,3-di (tert-butyl) cyclopentadienyl group, pentamethylcyclopentadienyl group or the like. In addition, X, Y, and Z are each independently a hydrogen atom, an alkyl group having 1 to 12 carbon atoms (specifically, methyl group, ethyl group, propyl group, n-butyl group, isobutyl group, amyl group, isoamyl group, octyl group and 2-ethylhexyl group), an alkoxyl group having 1 to 12 carbon atoms (specifically, methoxyl group, ethoxyl group, propoxyl group, butoxyl group, amyloxyl group, hexyloxyl group, octyloxyl group and 2-ethylhexyloxyl group), an aryl group having 6 to 20 carbon atoms (specifically, phenyl group and naphthyl group), an aryloxyl group having 6 to 20 carbon atoms (specifically, phenoxyl group), an arylalkyl group having 6 to 20 carbon atoms (specifically, benzyl group), an alkyl-or-arylamide group having 1 to 40 carbon atoms (specifically, dimethylamide group, diethylamide group, diphenylamide group and methylphenylamide group) or a halogen atom (specifically, chlorine, bromine, iodine and fluorine).

Specific examples of the titanium compound represented by the general formula (V) include cyclopentadienyltrimethyltitanium cyclopentadienyltriethyltitanium, cyclopentadienyltripropyltitanium, cyclopentadienyltributyltitanium, methylcyclopentadienyltrimethyltitanium, 1,2-dimethylcyclopentadienyltrimethyltitanium, 1, 2, 4-trimethylcyclopentadienyltrimethyltitaniam, 1, 2, 3, 4-tetramethylcyclopentadienyltrimethyltitanium, pentamethylcyclopentadienyltrimethyltitanium, pentamethylcyclopentadienyltriethyltitanium, pentamethylcyclopentadienyltripropyltitanium, pentamethylcyclopentadienyltributyltitanium, cyclopentadienylmethyltitanium dichloride, cyclopentadienylethyltitanium dichloride, pentamethylcyclopentadienylmethyltitanium dichloride, pentamethylcyclopentadienylethyltitanium dichloride, cyclopentadienyldimethyltitanium monochloride, cyclopentadienyldiethyltitanium monochloride, cyclopentadienyltitanium trimethoxide, cyclopentadienyltitanium triethoxide, cyclopentadienyltitanium tripropoxide, cyclopentadienyltitanium triphenoxide, pentamethylcyclopentadienyltitanium trimethoxide, pentamethylcyclopentadienyltitanium triethoxide, pentamethylcyclopentadienyltitanium tripropoxide, pentamethylcyclopentadienyltitanium tributoxide, pentamethylcyclopentadienyltitanium triphenoxide, cyclopentadienyltitanium trichloride, pentamethylcycloentadienyltitanium trichloride, cyclopentadienylmethoxyltitanium dichloride, cyclopentadienyldimethoxytitanium chloride, pentamethylcyclopentadienylmethoxytitanium dichloride, cyclopentadienyltribenzyltitanium, pentamethylcyclopentadienylmethyldiethoxytitanium, indenyltitanium trichloride, indenyltitanium trimethoxide, indenyltitanium triethoxide, indenyltrimethyltitanium, indenyltribenzyltitanium, (tert-butylamide) dimethyl(tetramethyl $\eta^5$-cyclopentadienyl)-silanetitanium dichloride, dimethyl(tert-butylamide)-dimethyl(tetramethyl $\eta^5$-cyclopentadienyl)-silanetitanium and (tert-butylamide)dimethyl(tetramethyl $\eta^5$-cyclopentadienyl)silanetitanium dimethoxide.

Of these titanium compounds, a compound not containing a halogen atom is preferred and a titanium compound having one τ electron type ligand is particularly desirable.

Furthermore, a condensed titanium compound represented by the general formula (VI) may be used as the titanium compound.

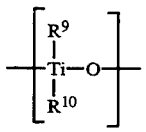
(VI)

wherein $R^9$ and $R^{10}$ each represent a halogen atom, an alkoxyl group having 1 to 20 carbon atoms or an acyloxyl group; and k is an integer from 2 to 20.

Furthermore, the above titanium compounds may be used in the form of a complex formed with an ester, an ether or the like.

The trivalent titanium compound represented by the formula (IV) typically includes a trihalogenated titanium such as titanium trichloride; and a cyclopentadienyltitanium compound such as cyclopentadienyltitanium dichloride, pentamethylcyclopentadienyltitanium dimethoxide and also those obtained by reducing a tetravalent titanium compound. These trivalent titanium compounds may be used in the form of a complex formed with an ester, an ether or the like.

In addition, examples of the zirconium compound used as the transition metal compound include tetrabenzylzirconium, zirconium tetraethoxide, zirconium tetrabutoxide, bisindenylzirconium dichloride, triisopropoxyzirconium chloride, zirconium benzyldichloride and tributoxyzirconium chloride. Examples of the hafnium compound include tetrabenzylhafnium, hafnium tetraethoxide and hafnium tetrabutoxide. Example of the vanadium compound include vanadyl bisacetylacetonato, vanadyl triacetylacetonato, vanadyl triethoxide and vanadyl tripropoxide. Of these transition metal compounds, the titanium compounds are particularly suitable.

Aside from the foregoing, the transition metal compounds constituting the component (a) of the catalyst include the transition metal compound with two ligands having conjugated π electrons, for example, at least one compound selected from the group consisting of the transition metal compounds represented by the general formula:

$$M^1R^{11}R^{12}R^{13}R^{14} \quad \text{(VII)}$$

wherein $M^1$ is titanium, zirconium or hafnium; $R^{11}$ and $R^{12}$ are each a cyclopentadienyl group, substituted cyclopentadienyl group, indenyl group or fluorenyl group; and $R^{13}$ and $R^{14}$ are each a hydrogen atom, a halogen atom, a hydrocarbon group having 1 to 20 carbon atoms, an alkoxyl group having 1 to 20 carbon atoms, an amino group or thioalkoxyl group having 1 to 20 carbon atoms, but $R^{11}$ and $R^{12}$ may be each crosslinked by a hydrocarbon group having 1 to 5 carbon atoms, alkylsilyl group having 1 to 20 carbon atoms and 1 to 5 silicon atoms or germanium-containing hydrocarbon group having 1 to 20 carbon atoms and 1 to 5 germanium atoms.

In more detail, each of $R^{11}$ and $R^{12}$ in the general formula (VII) designates a cyclopentadienyl group, substituted cyclopentadienyl group, more specifically, methylcyclopentadienyl group; 1,3-dimethylcyclopentadienyl group; 1,2,4-trimethylcyclopentadienyl group; 1,2,3,4-tetramethylcyclopentadienyl group; pentamethylcyclopentadienyl group; trimethylsilylcyclopentadienyl group; 1,3-di(trimethylsilyl)cyclopentadienyl group; 1,2,4-tri(trimethylsilyl)cyclopentadienyl group; tert-butylcyclopentadienyl group; 1,3-di(tert-butyl)cyclopentadienyl group; 1,2,4-tri(tert-butyl)cyclopentadienyl group or the like, indenyl group, substituted indenyl group, more specifically, methylindenyl group; dimethylindenyl group; trimethylindenyl group or the like, fluorenyl group, or substituted fluorenyl group such as methylfluorenyl group, and may be the same or different and crosslinked by a alkylidene group having 1 to 5 carbon atoms, more specifically, methine group; ethylidene group; propylidene group; dimethylcarbyl group or the like, or an alkylsilyl group having 1 to 20 carbon atoms and 1 to 5 silicon atoms, more specifically, dimethylsilyl group; diethylsilyl group; dibenzylsilyl group or the like. Each of $R^{13}$ and $R^{14}$ independently indicates, as described above but more specifically, a hydrogen atom; an alkyl group having 1 to 20 carbon atoms such as methyl group, ethyl group, propyl group, n-butyl group, isobutyl group, amyl group, isoamyl group, octyl group or 2-ethylhexyl group; an aryl group having 6 to 20 carbon atoms such as phenyl group or naphthyl group; an arylalkyl group having 7 to 20 carbon atoms such as benzyl group; an alkoxyl group having 1 to 20 carbon atoms such as methoxyl group, ethoxyl group, propoxyl group, butoxyl group, amyloxyl group, hexyloxyl group, octyloxyl group or 2-ethylhexyloxyl group; an aryloxyl group having 6 to 20 carbon atoms such as phenoxyl group; an amino group; or a thioalkoxyl group having 1 to 20 carbon atoms.

Specific examples of the transition metal compounds represented by the general formula (VII) wherein $M^1$ is titanium include bis(cyclopentadienyl)dimethyltitanium; bis(cyclopentadienyl)diethyltitanium; bis(cyclopentadienyl)dipropyltitanium; bis(cyclopentadienyl)dibutyltitanium; bis(methylcyclopentadienyl)dimethyltitanium; bis(tert-butylcyclopentadienyl)dimethyltitanium; bis(1,3-dimethylcyclopentadienyl)dimethyltitanium; bis(1,3-di-tert-butylcyclopentadienyl)dimethyltitanium; bis(1,2,4-trimethylcyclopentadienyl)dimethyltitanium; bis(1,2,3,4-tetramethylcyclopentadienyl)dimethyltitanium; bis(cyclopentadienyl)dimethyltitanium; bis(trimethylsilylcyclopentadienyl)dimethyltitanium; bis(1,3-di(trimethylsilyl)cyclopentadienyl)dimethyltitanium; bis(1,2,4-tri((trimethylsilyl)cyclopentadienyl)dimethyltitanium; bis(indenyl)dimethyltitanium; bis(fluorenyl)dimethyltitanium; methylenebis(cyclopentadienyl)dimethyltitanium; ethylidenebis(cyclopentadienyl)dimethyltitanium; methylenebis(2,3,4,5-tetramethylcyclopentadienyl)dimethyltitanium; ethylidenebis(2,3,4,5-tetramethylcyclopentadienyl)dimethyltitanium; dimethylsilylbis(2,3,4,5-tetramethylcyclopentadienyl)dimethyltitanium; methylenebisindenyldimethyltitanium; ethylidenebisindenyldimethyltitanium; dimethylsilylbisindenyldimethyltitanium; methylenebisfluorenyldimethyltitanium; ethylidenbisfluorenyldimethyltitanium; dimethylsilylbisfluorenyldimethyltitanium; methylene(tert-butylcyclopentadienyl)(cyclopentadienyl)dimethyltitanium; methylene(cyclopentadienyl)(indenyl)dimethyltitanium; ethylidene(cyclopentadienyl)(indenyl)dimethyltitanium; dimethylsilyl(cyclopentadienyl)(indenyl)dimethyltitanium; methylene(cyclopentadienyl)(fluorenyl)dimethyltitanium; ethylidene(cyclopentadienyl)(fluorenyl)dimethyltitanium; dimethylsilyl(cyclopentadienyl)(fluorenyl)dimethyltitanium; methylene(indenyl)(fluorenyl)dimethyltitanium; ethylidene(indenyl)(fluorenyl)dimethyltitanium; dimethylsilyl(indenyl)(fluorenyl)dimethyltitanium; bis(cyclopentadienyl)dibenzyltitanium; bis(tert-butylcyclopentadienyl)dibenzyltitanium; bis(methylcyclopentadienyl)dibenzyltitanium; bis(1,3-dimethylcyclopentadienyl)dibenzyltitanium; bis(1,2,4-trimethylcyclopentadienyl)dibenzyltitanium; bis(1,2,3,4-tetramethylcyclopentadienyl)dibenzyltitanium; bis(pentamethylcyclopentadienyl)dibenzyltitanium; bis(trimethylsilylcyclopentadienyl)dibenzyltitanium; bis[1,3-di-(trimethylsilyl)cyclopentadienyl]dibenzyltitanium; bis[1,2,4-tri(trimethylsilyl)cyclopentadienyl]dibenzyltitanium; bis(indenyl)dibenzyltitanium; bis(fluorenyl)dibenzyltitanium; methylenebis(cyclopentadienyl)dibenzyltitanium; ethylidenebis(cyclopentadienyl)dibenzyltitanium; methylenebis(2,3,4,5-tetramethylcyclopentadienyl)dibenzyltitanium; ethylidenebis(2,3,4,-5tetramethylcyclopentadienyl)dibenzyltitanium; dimethylsilylbis(2,3,4,5-tetramethylcyclopentadienyl)dibenzyltitanium; methylenebis(indenyl)dibenzyltitanium; ethylidenebis(indenyl)dibenzyltitanium; dimethylsilylbis(indenyl)dibenzyltitanium; methylenebis(fluorenyl)dibenzyltitanium; ethylidenebis(fluorenyl)dibenzyltitanium; dimethylsilylbis(fluorenyl)dibenzyltitanium; methylene(cyclopentadienyl)(indenyl)dibenzyltitanium; ethylidene(cyclopentadienyl)(indenyl)dibenzyltitanium; dimethylsilyl(cyclopentadienyl)(indenyl)dibenzyltitanium; methylene(cyclopentadienyl)(fluorenyl)dibenzyltitanium; ethylidene(cyclopentadienyl)(fluorenyl)dibenzyltitanium; dimethylsilyl(cyclopentadienyl)(fluorenyl)dibenzyltitanium; methylene(indenyl)(fluorenyl)dibenzyltitanium; ethylidene(indenyl)(fluorenyl)dibenzyltitanium; dimethylsilyl(indenyl)(fluorenyl)dibenzyltitanium; biscyclopentadienyltitanium dimethoxide; biscyclopentadienyltitanium diethoxide; biscyclopentadienyltitanium dipropoxide; biscyclopentadienyltitanium dibutoxide; biscyclopentadienyltitanium dipheoxide; bis(methylcyclopentadienyl)titanium dimethoxide; bis(1,3-dimethylcyclopentadienyl)titanium dimethoxide; bis(1,2,4-trimethylcyclopentadienyl)titanium dimethoxide; bis(1,2,3,4-tetramethylcyclopentadienyl)titanium dimethoxide; bispentamethylcyclopentadienyltitanium dimethoxide; bis(trimethylsilylcyclopentadienyl)titanium dimethoxide; bis[1,3-di(trimethylsilyl)cyclopentadienyl]titanium dimethoxide; bis[1,2,4-tri(trimethylsilyl)cyclopentadienyl]titanium dimethoxide; bisindenyltitanium dimethoxide; bisfluorenyltitanium dimethoxide; methylenebiscyclopentadienyltitanium dimethoxide; ethylidenebiscyclopentadienyltitanium dimethoxide; methylenebis(2,3,4,5-tetramethylcyclopentadienyl)titanium dimethoxide; ethylidenebis(2,3,4,5-tetramethylcyclopentadienyl)titanium dimethoxide; dimethylsilylbis(2,3,4,5-tetramethylcyclopentadienyl)titanium dimethoxide; methylenebisindenyltitanium dimethoxide; methylenebis(methylindenyl)titanium dimethoxide; ethylidenebisindenyltitanium dimethoxide; dimethylsilylbisindenyltitanium dimethoxide; methylenebisfluorenyltitanium dimethoxide; methylenebis(methylfluorenyl)titanium dimethoxide; ethylidenebisfluorenyltitanium dimethoxide; dimethylsilylbisfluorenyltitanium dimethoxide; methylene(cyclopentadienyl)(indenyl)titanium dimethoxide; ethylidene(cyclopentadienyl)(indenyl)titanium dimethoxide; dimethylsilyl(cyclopentadienyl)(indenyl)titanium dimethoxide; methylene(cyclopentadienyl)(fluorenyl)titanium dimethoxide; ethylidene(cyclopentadienyl)(fluorenyl)titanium dimethoxide; dimethylsilyl(cyclopentadienyl)(fluorenyl)titanium dimethoxide; methylene(indenyl)(fluorenyl)titanium dimethoxide; ethylidene(indenyl)(fluorenyl)titanium dimethoxide; and dimethylsilyl(indenyl)(fluorenyl)titanium dimethoxide.

Examples of the transition metal compounds represented by the formula (VII) wherein $M^1$ is zirconium include ehylidenbiscyclopentadienylzirconium dimethoxide and dimethylsilylbiscyclopentadienylzirconium dimethoxide. Examples of the hafnium compounds according to the general formula (VII) include ethylidenebiscyclopentadienylhafnium dimethoxide, dimethylsilylbiscyclopentadienylhafnium dimethoxide, etc. Particularly desirable transition metal compounds among them are titanium compounds. In addition to the combinations of the above, the compound may be a bidentate coordination complex compound such s 2,2'-thiobis (4-methyl-6-tert-butylphenyl)titanium diisopropoxide; 2,2'-thiobis(4-methyl-6-tert-butylphenyl)titanium dimethoxide or the like.

As the coordination complex compound composed of a cation and an anion in which a plurality of radicals are bonded to a metal, that is, the component (b) of the polymerization catalyst to be used in the present invention, there are preferably usable the coordination complex compounds represented by the following general formula (VIII) or (IX):

$$(L^1-H^{g+})_h(M^2X^1X^2 \cdots X^{n(n-p)-})_i \quad (\text{VIII})$$

or $$(L^{2g+})_h(M^3X^1X^2 \cdots X_n(^nP-P)^-)_i \quad (\text{IX})$$

wherein $L^2$ is $M^4,T^1T^2M^5$ or $T_3C$ as hereinafter described; $L_1$ is a Lewis base; $M^2$ and $M^3$ are each a metal selected from Groups 5 to 15 of the Periodic Table; $M^4$ is a metal selected from Groups 8 to 12 of the Periodic Table; $M^5$ is a metal selected from Groups 8 to 10 of the Periodic Table; $X^1$ to $X^n$ are each a hydrogen atom, a dialkylamino group, an alkoxy group, an aryloxyl group, an alkyl group having 1 to 20 carbon atoms, an aryl group an alkylaryl group or an arylalkyl group, each having 6 to 20 carbon atoms, a substituted alkyl group, a substituted aryl group, an organometalloid group or a halogen atom; $T^1$ and $T^2$ are each a cyclopetnadienyl group, a substituted cyclopentadienyl group, an indenyl group or a fluorenyl group; $T^3$ is an alkyl group; p is the valency of each of $M^2$ and $M^3$, indicating an integer of 1 to 7; n is an integer of 2 to 8; g is the ion valency of each of [$L^1$-H] and [$L^2$], indicating an integer of 1 to 7; h is an integer of 1 or more; and i=hxg/(n−p).

Specific examples of $M^2$ and $M^3$ include B, Al, Si, P, As, Sb, etc. in the form of atom; those of $M^4$ include Ag, Cu, etc. in the form of atom; and those of $M^5$ include Fe, Co, Ni, etc. in the form of atom. Specific examples of $X^1$ to $X^n$ include a dialkylamino group such as dimethylamino and diethylamino; an alkoxyl group such as methoxyl, ethoxyl and n-butoxyl; an aryloxyl group such as phenoxyl, 2,6-dimethylpheoxyl and naphthyloxyl; an alkyl group having 1 to 20 carbon atoms such as methyl, ethyl, n-propyl, iso-propyl, n-butyl, n-octyl and 2-ethylhexyl; an aryl group, an alkylaryl group or an arylalkyl group each having 6 to 20 carbon atoms, such as phenyl, p-tolyl, benzyl, pentafluorophenyl, 3,5-di(trifluoromethyl)phenyl, 4-tert-butylphenyl, 2,6-dimethylphenyl, 3,5-dimethylphenyl, 2,4dimethylphenyl and 1,2-dimethylphenyl; a halogen atom such as F, Cl, Br and I; and an organometalloid such as pentamethylantimony group, trimethylsilyl group, trimethylgermyl group, diphenylarsine group, dicyclohexylantimony group and diphenylboron group. Specific examples of substituted cyclopetnadienyl group of $T^1$ and $T^2$ include methylcyclopentadienyl, butylcyclopentadienyl and pentamethylcyclopentadienyl.

Among the compounds represented by the general formula (VIII) or (IX), specific examples of preferably usable compounds include, as the compound of general formula (VIII), triethylammonium tetraphenylborate, tri(n-butyl)ammonium tetraphenylborate, trimethylammonium tetraphenylborate, triethylammonium tetra(pentafluorophenyl)borate, tri(n-butyl)ammonium tetra(pentafluorophenyl)borate, triethylammonium hexafluoroarsenate, etc., and as the compound of general formula (IX), pyridinium tetra(pentafluorophenyl)borate, pyrrolinium tetra(pentafluorophenyl)borate, N,N-dimethylanilinium tetra(pentafluorophenyl)borate, methyldiphenylammonium tetra(pentafluorophenyl)borate, ferrocenium tetraphenylborate, dimethylferrocenium tetra(pentafluorophenyl)borate, ferrocenium tetra(pentafluorophenyl)borate, decamethylferrocenium tetra(pentafluorophenyl)borate, acetylferrocenium tetra(pentafluorophenyl)borate, formylferrocenium tetra(pentafluorophenyl)borate, cyanoferrocenium tetra(pentafluorophenyl)borate, silver tetraphenylborate, silver tetra(pentafluorophenyl)borate, trityl tetraphenylborate, trityl tetra(pentafluorophenyl)borate, silver hexafluoroarsenate, silver hexafluoroantimonate, silver tetrafluoroborate, etc.

As the component (b) of the polymerization catalyst to be used in the present invention, an aluminoxane may be used instead of the coordination complex compound composed of a cation and an anion in which a plurality of radicals are bonded to a metal.

The aluminoxane is a compound obtained by contacting one of various organoaluminum compounds with a condensing agent. As the organoaluminum compound used as a starting material, an organoaluminum compound represented by the general formula:

$$AlR^{15}_3 \quad (X)$$

wherein $R^{15}$ is an alkyl group having 1 to 8 carbon atoms, more specifically, trimethylaluminum, triethylaluminum, triisobutylaluminum and the like can be mentioned, and among them trimethylaluminum is particulary desirable.

On the other hand, a typical example of the condensing agent for said organoluminum compound is water. In addition, any compound capable of undergoing a condensation reaction with an organoaluminum compound including alkylaluminum may be used.

Examples of the aluminoxane of Component (b) include chain alkylaluminoxane represented by the general formula (XI):

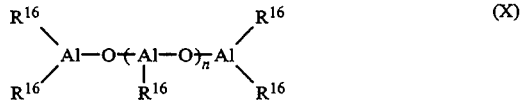

wherein n is a number from 2 to 50 indicating polymerization degree and $R^{16}$ represents an alkyl group having 1 to 8 carbon atoms, cycloalkylaluminoxane having the repeating unit represented by the general formula (XII):

wherein $R^{16}$ is as previously defined and the like. Of these alkylaluminoxanes, that wherein $R^{16}$ is a methyl group, i.e. methylaluminoxane is particularly preferred.

Generally, the reaction product of an alkylaluminum compound such as trialkylaluminum with water contains the above-mentioned chain alkylaluminoxane and cycloalkylaluminoxane, unreacted trialkylaluminum, a mixture of various condensation products, and further complicatedly associated molecules thereof, which becomes various products according to the contacting conditions of the alkylaluminum compound and water.

The reaction of the alkylaluminum compound with water is not specifically limited, but can be performed according to any of known methods.

The catalyst according to the present invention may contain, when necessary, an alkylating agent as component (c). There are available various alkyl group-containing compounds as alkylating agents, which are exemplified by the aluminum compound having an alkyl group represented by the general formula (XIII)

$$R^{17}_p Al(OR^{18})_n X_{3-m-n} \quad (XIII)$$

wherein $R^{17}$ and $R^{18}$ are each an alkyl group having 1 to 8, preferably 1 to 4 carbon atoms, X is a hydrogen atom or a halogen atom, m satisfies the relation $0 < m \leq 3$, desirably m=2 or 3, most desirably m=3, and n satisfied the relation $0 \leq n < 3$, desirably n=0 or 1; the magnesium compound having an alkyl group represented by the general formula (XIV)

$$R^{17}_2 Mg \quad (XIV)$$

wherein $R^{17}$ is as previously defined; the zinc compound having an alkyl group represented by the general formula (XV)

$$R^{17}_2 Zn \quad (XV)$$

wherein $R^{17}$ is as previously defined; and the like.

The aboresaid compound having an alkyl group are preferably aluminum compounds having an alkyl group, more desirably trialkylaluminium compounds and dialkylaluminum compounds. Examples of the compounds, that is, the components (C) include trialkylaluminum such as trimethylaluminum, triethylaluminum, tri-n-propylaluminum, triisopropylaluminum, tri-n-butyl-aluminum, triisobutylaluminum and tri-tert-butylaluminum; dialkylaluminum halide such as dimethylaluminum chloride, diethylaluminum chloride, di-n-propylaluminum chloride, diisopropylaluminum chloride, di-n-butylaluminum chloride, diisobutylaluminum chloride and di-tert-butylaluminum chloride; dialkylaluminum alkoxide such as dimethylaluminum methoxide and dealkylaluminum alkoxide; dialkylaluminum hydride such as dimethylaluminum hydride, diethylalumium hydride and diisobutylaluminum hydride, dialkylmagensium such as dimethylmagnesium, diethylmagnesium, di-n-propylmagnesium and diisopropylmagnesium; and dialkylzinc such as dimethylzinc, diethylzinc, di-n-propylethylzinc and diisopropylzinc, and the like.

The polymerization catalyst of the present invention, which comprises the abovestated components (a) and (b) and, as required, (c) as primary ingredients, can be prepared by various methods including: a method in which any one of the catalytic components is added to the monomer separately in any order and a method in which the catalytic components are reacted to form a reaction product in advance, which is then added to the monomer.

The addition or contact of the above-mentioned components (a), (b) and (c) may be carried out at a temperature in the range of 0 to 100° C., and needless to say, at the polymerization temperature. There is no specific limitation in the orders of addition and contact of the components (a), (b) and (c).

The catalyst according to the present invention as described hereinbefore exhibits a high activity in the production of a styrenic polymer having a high degree of syndiotactic configuration.

The production of the Styrenic polymer according to the present invention is put into practice by polymerizing or copolymerizing at least one styrenic monomer selected from the group consisting of styrene and derivatives thereof such as an alkylstyrene, an alkoxystyrene, a halogenated styrene, a vinyl benzoate ester, a divinyl benzene and an organic silicon styrene in the presence of the catalyst comprising as the principal components, the components (a) and (b) and, when necessary, the component (c).

The polymerization of the styrenic monomer or monomers may be carried out by means of bulk polymerization or solution polymerization by the use of an aliphatic hydrocarbon solvent such as pentane, hexane or heptane, an alicyclic hydrocarbon solvent such as cyclohexane or an aromatic hydrocarbon solvent such as benzene, toluene or xylene. The polymerization temperature is not specifically limited, but is usually in the range of 20° to 120° C., preferably 40° to 100° C.

It is indispensable in the process according to the present invention to dissolve hydrogen in the styrenic monomer under a hydrogen partial pressure of at most 1 kg/cm$^2$G, preferably 0.001 to 0.7 kg/cm$^2$G, followed by the polymerization of the resultant hydrogen dissolved monomer for the purpose of modifying the molecular weight of the objective styrenic polymer. The hydrogen partial pressure in the polymerization reaction system during the polymerization reaction is not specifically limited, but is usually in the range of 0.001 to 1 kg/cm$^2$G.

The styrenic polymer thus obtained possesses a high degree of syndiotactic configuration. Here, the styrenic polymer having a high degree of syndiotactic configuration means that its stereochemical structure is mainly of syndiotactic configuration, i.e. the stereostructure in which phenyl groups or substituted phenyl group as side chains are located alternately at opposite directions relative to the main chain consisting of carbon-carbon bonds. Tacticity is quantitavely determined by the nuclear magnetic resonance method ($^{13}$C-NMR method) using carbon isotope. The tacticity as determined by the $^{13}$C-NMR method can be indicated in terms of proportions of structural units continuously connected to each other, i.e., a diad in which two sturctural units are connected to each other, a triad in which three structural units are connected to each other and a pentad in which five structural units are connected to each other. "The styrenic polymers having a high degree of syndiotactic configuration" as mentioned in the present invention means polystyrene, poly(alkylstyrene), poly(halogenated styrene), poly(alkoxystyrene), poly(vinylbenzoate), polydivinyl benzene, polyorganic silicon styrene, the mixtures thereof, and copolymers containing the above polymers as main components, having such a syndiotacticity that the proportion of racemic diad is at least 75%, preferably at least 85%, or the proportion of racemic pentad is at least 30%, preferably at least 50%. The poly(alkylstyrene) include poly(methylstyrene), poly(ethylstyrene) poly(isopropylstyrene), poly(tert-buthylstyrene), etc., poly(halogenated styrene) include, poly(chlorostyrene), poly(bromostyrene), and poly(fluorostyrene), etc. The poly(alkoxystyrene) include, poly(methoxystyrene), poly(ethoxystyrene), etc.

The most desirable styrenic polymers are polystyrene, poly(p-methylstyrene), poly(m-methylstyrene), poly(p-tert-butylstyrene), poly(p-chlorostyrene), poly(m-chlorostyrene), poly(p-fluorostyrene), and the copolymer of styrene and p-methylstyrene.

The styrenic polymer obtained according to the process of the present invention is that with a high degree of syndiotacticity usually having a weight-average molecular weight of 10,000 to 3,000,000, preferably 100,000 to 1,500,000 with a number-average molecular weight of 5,000 to 1,500,000, preferably 50,000 to 1,000,000. The resultant polymer has a high degree syndiotactic configuration as such as described above, and a styrene polymer having an exceptionally high degree of syndiotacticity as well as an extremely high purity can be obtained by the steps of deashing treatment of the polymer thus obtained, as required, with a washing agent containing hydrochloric acid, etc.; additional washing; drying under reduced pressure; cleaning with a solvent such as methyl ethyl ketone for removing solubles therein; and treatment of the insolubles thus obtained by the use of chloroform, etc.

The styrene polymer with a high degree of syndiotacticity has a melting point of 160° to 310° C. and is surpassingly superior to the conventional styrenic polymer having an atactic configuration with regard to heat resistance.

As descrbed hereinbefore, the process according to the present invention makes it possible to modify the molecular weight of SPS to be produced, particularly to lower the molecular weight thereof without expanding the molecular weight distribution thereof and at the same time, to decrease the required quantity of the catalyst as well as the residual quantities of metals contained in the resultant SPS, thus considerably curtailing the production cost of the objective SPS, In the following, the present invention will be described in more detail with reference to examples, which however shall not be construed to limet the present invention thereto.

EXAMPLE 1

(1) Preparation of mixed solvent

To 400 ml of toluene were added, in an atmosphere of nitrogen, 1.5 mmol of triisobutylaluminum, 0.60g of dimethylanilinium tetra (pentafluorophenyl) borate (DMAB) and 0.75 mmol of pentamethylcyclopentadienyltitanium trimethoxide to make a total volume of 500 ml.

(2) Preparation of styrene monomer

To one (1) liter of styrene were added 0,50 ml of 0.5 mol/liter triisobutylaluminum and one (1) ml of 0.5 mol/liter triethylaluminum (TEA) and hydrogen was dissolved in the resultant mixture to saturate the same with hydrogen under atmospheric pressure.

(3) A one (1) liter polymerization vessel was charged with styrene at e feed rate of 9.2 ml/min, while the mixed solvent as prepared in the preceding item (1) was fed in the vessel at a feed rate of 0.5 ml/min to proceed with polymerization in an atmosphere of hydrogen. As a result, powdery SPS having a weight-average molecular weight of 438,000 at a conversion efficiency of 46.0% was obtained at the outlet of the polymerization vessel. Other conditions and results are given in Table 1.

Comparative Example 1

The procedure in Example 1 was repeated to produce SPS except that hydrogen was not dissolved in the mixture in item (2) Preparation of styrene monomer and that the polymerization was carried out in an atmosphere of nitrogen instead of hydrogen. Other conditions and results are given in Table 1.

EXAMPLES 2 & 3

The procedure in Example 1 was repeated to produce SPS except that the polymerization atmosphere, polymerization temperature and the amount of triethylaluminum (TEA) to be added were each set on the values as given in Table 1. Other conditions and results are given in Table 1.

Comparative Examples 2 & 3

The procedure in Comparative Example 1 was repeated to produce SPS except that the polymerization atmosphere, polymerization temperature and the amount of TEA to be added were each set on the values as given in Table 1. Other conditions and results are given in Table 1.

Comparative Example 4

The procedure in Example 4 was repeated to produce SPS except that hydrogen was not fed in the reaction system. As a result, 83 g of SPS having a weight-average molecular weight of 630,000 and Mw/Mn of 2.6 was obtained at a conversion efficiency of 46%.

Comparative Example 5

The procedure in Example 4 was repeated to produce SPS except that hydrogen partial pressure was set on 2 kg/cm$^2$G. As a result, 12 g of SPS having a weight-average molecular weight of 40,000 and Mw/Mn as determined by GPC of 20 was obtained at a Conversion efficiency of 6.7%.

What is claimed is:

1. A process for producing a styrenic polymer having a syndiotactic configuration which comprises polymerizing a styrenic monomer containing hydrogen dissolved therein at a hydrogen partial pressure of at most 1 kg/cm$^2$G by the use of a polymerization catalyst comprising an (a) transition metal compound and (b) at least one member selected from the group consisting of a coordination complex compound composed of a cation and an anion in which a plurality of radicals are bonded to a metal, and an aluminoxane.

2. The process according to claim 1 wherein the hydrogen is dissolved in the styrenic monomer under a hydrogen partial pressure in the range of 0.001 to 0.7 kg/cm$^2$G and the polymerization of the styrenic monomer is effected under a hydrogen partial pressure in the range of 0.001 to 1.0 kg/cm$^2$G.

3. The process according to claim 1 wherein the transition metal in the transition metal compound is selected from the group consisting of titanium, zirconium and hafnium.

4. The process according to claim 1 wherein the aluminoxane is a condensation reaction product of a trialkylaluminum with water.

5. A process for producing a styrenic polymer having a syndiotactic configuration which comprises polymer-

TABLE 1

|  | Atmosphere | Temperature (°C.) | Amount of TEA (ml/l) | Conversion efficiency (%) | Weight-average molecular weight | Mw/Mn |
| --- | --- | --- | --- | --- | --- | --- |
| Example 1 | hydrogen | 70 | 1 | 46.0 | 438,000 | 2.5 |
| Comp. Example 1 | nitrogen | 70 | 1 | 36.1 | 584,000 | 2.5 |
| Example 2 | hydrogen | 70 | 5 | 50.5 | 223,000 | 2.4 |
| Comp. Example 2 | nitrogen | 70 | 5 | 40.1 | 295,000 | 2.6 |
| Example 3 | hydrogen | 85 | 0 | 41.7 | 351,000 | 2.4 |
| Comp. Example 3 | nitrogen | 85 | 0 | 32.1 | 438,000 | 2.3 |

EXAMPLES 4

A one (1) liter polymerization vessel was charged with 200 ml of styrene, 0.10 ml of 0.5 mol/liter triisobutylaluminum and 0.2 ml of 0.5 mol/liter TEA and the temperature was set on 70° C. Hydrogen was fed in the vessel to dissolve it in the reactant until the hydrogen partial pressure reached 0.2 kg/cm$^2$G and 6.6 ml of the catalyst as prepared in Example 1 was added to the reaction system to proceed with polymerization for one (1) hour. As a result, 97 g of SPS having a weight-average molecular weight of 360,000 and Mw/Mn (the ratio of weight-average molecular weight (Mw) to number-average molecular weight (Mn)) of 2.8 was obtained at a onversion efficiency of 54%.

izing a styrenic monomer containing hydrogen dissolved therein at a hydrogen partial pressure of at most 1 kg/cm$^2$G by the use of a polymerization catalyst comprising an (a) transition metal compound, (b) at least one member selected from the group consisting of a coordination complex compound composed of a cation and an anion in which a plurality of radicals are bonded to a metal, and an aluminoxane and a (c) alkylating agent.

6. The process according to claim 5 wherein the hydrogen is dissolved in the styrenic monomer under a hydrogen partial pressure in the range of 0.001i to 0.7 kg/cm$^2$G and the polymerization of the styrenic monomer is effected under a hydrogen partial pressure in the range of 0.001 to 1.0 kg/cm$^2$G.

7. The process according to claim 5 wherein the transition metal in the transition metal compound is selected from the group consisting of titanium, zirconium and hafnium.

8. The process according to claim 5 wherein the aluminoxane is a condensation reaction product of a trialkylaluminum with water.

9. The process according to claim 5 wherein the alkylating agent is at least one member selected from the group consisting of aluminum compounds having alkyl groups, magnesium compounds having alkyl groups and zinc compounds having alkyl groups.

* * * * *